US010320836B2

(12) United States Patent
Ben David et al.

(10) Patent No.: US 10,320,836 B2
(45) Date of Patent: *Jun. 11, 2019

(54) AUTOMOTIVE ECU CONTROLLER AND DATA NETWORK HAVING SECURITY FEATURES FOR PROTECTION FROM MALWARE TRANSMISSION

(71) Applicant: Karamba Security Ltd., Hod Hasharon (IL)

(72) Inventors: Tal Efraim Ben David, Hogla (IL); Assaf Harel, Ramat Hasharon (IL); Amiram Dotan, Birmingham, MI (US); David Barzilai, Hod Hasharon (IL)

(73) Assignee: KARAMBA SECURITY LTD., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,521

(22) Filed: Jul. 16, 2018

(65) Prior Publication Data
US 2018/0343270 A1 Nov. 29, 2018

Related U.S. Application Data
(63) Continuation of application No. 15/861,309, filed on Jan. 3, 2018, now Pat. No. 10,057,286.
(Continued)

(51) Int. Cl.
*H01L 29/06* (2006.01)
*H04L 29/06* (2006.01)
(Continued)

(52) U.S. Cl.
CPC ............ *H04L 63/145* (2013.01); *G06F 21/55* (2013.01); *H04L 63/101* (2013.01);
(Continued)

(58) Field of Classification Search
CPC ............. H04L 63/1416; H04L 63/1408; H04L 63/1441; H04L 63/1458
(Continued)

(56) References Cited

U.S. PATENT DOCUMENTS

2003/0009271 A1* 1/2003 Akiyama ............... G06F 21/335
701/29.6
2013/0111582 A1* 5/2013 Forest ..................... G06F 21/44
726/19
(Continued)

*Primary Examiner* — Evans Desrosiers
(74) *Attorney, Agent, or Firm* — Finnegan, Henderson, Farabow, Garrett & Dunner, LLP

(57) ABSTRACT

In one implementation, a method for providing security on controllers includes detecting, by a given controller, an attempted security attack on the given controller; in response to detecting the attempted attack, entering a safe mode of operation for the given controller in which at least one process performed by the given controller is restricted such that the at least one process is performed only when a current context of the controller matches a permitted context that is associated with the given controller; in response to detecting the attempted attack, transmitting a safe mode alert to one or more other controllers; and for at least one of the one or more other controllers, in response to receiving the safe mode alert, entering a safe mode of operation for the other controller.

19 Claims, 9 Drawing Sheets

Related U.S. Application Data

(60) Provisional application No. 62/441,767, filed on Jan. 3, 2017.

(51) Int. Cl.
  *G06F 21/55* (2013.01)
  *H04W 12/12* (2009.01)
  *H04L 12/40* (2006.01)
  *H04L 29/08* (2006.01)

(52) U.S. Cl.
  CPC ............ *H04L 63/105* (2013.01); *H04L 63/14* (2013.01); *H04L 63/20* (2013.01); *H04W 12/12* (2013.01); *H04L 67/12* (2013.01); *H04L 2012/40215* (2013.01); *H04L 2012/40273* (2013.01)

(58) Field of Classification Search
  USPC .......................................................... 726/23
  See application file for complete search history.

(56) References Cited

U.S. PATENT DOCUMENTS

| | | | |
|---|---|---|---|
| 2014/0380503 A1* | 12/2014 | Matsushima | G06F 21/14 726/27 |
| 2016/0142410 A1* | 5/2016 | Mazzara, Jr. | H04W 12/08 726/4 |
| 2016/0352712 A1* | 12/2016 | Tamp | H04W 4/44 |

* cited by examiner

| UID | Name | Type | Digital Sign | Context |
|---|---|---|---|---|
| 1 | uConnect | Binary File | 1AB542FD33 | Initiation |
| ⋮ | | | | |
| N | Volume.lua | Script File | 9233DFE33 | All |

400 — 402 UID, 404 Name, 406 Type, 408 Digital Sign, 410 Context; 412a (first row), 412n (last row)

FIG. 4

AUTOMOTIVE ECU CONTROLLER AND DATA NETWORK HAVING SECURITY FEATURES FOR PROTECTION FROM MALWARE TRANSMISSION

CLAIM OF PRIORITY

This application is a continuation of U.S. patent application Ser. No. 15/861,309 filed Jan. 3, 2018, which claims priority to U.S. Provisional Application Ser. No. 62/441,767, filed on Jan. 3, 2017, the entire contents of which are hereby incorporated by reference.

TECHNICAL FIELD

This specification generally relates to network security.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems.

Like any other externally connected computers, IoT devices (e.g., ECUs in connected cars) are vulnerable to cyber-attack and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber-attacks come in many forms and flavors, but they generally share the same basic concepts: find a preexisting security bug (vulnerability) in the system's software, exploit it, and run malware. A common security bug is neglecting to verify the size of input buffers, which hackers can exploit by passing long buffers that get out of the boundaries allocated for that buffer on the software stack. By getting out of the buffer boundaries, hackers may be able to access and change the pointer structure that controls the functional flow of code, which hackers can use to direct the controller to execute malware code. Although malware code can vary (e.g., keylogger, ransomware, e-mail spam), the exploitation mechanism is often similar—find a security bug, research and learn how to exploit it in order to gain control, and use the control to run the malware code.

SUMMARY

This document generally describes a technological solution that hardens externally connected controllers (e.g., ECUs) within an IoT device (e.g., connected automobile) against hackers. Customized security policies for controllers can be generated and added to controllers with security layers, which can use the security policies and layers to ensure that only valid code and valid behaviors are allowed to run on the controllers. Various features can be used to ensure controllers are limited to operating with valid code and valid behaviors, such as using whitelists that define permitted code and to define permitted contexts within which the code can run, and using modes of operation to determine when particular whitelists and contexts should be used to ensure secure operation.

For example, ECUs on a car can each include a custom security policy that defines whitelisted processes and contexts within which those processes are permitted to run. When an ECU encounters a process that is not authorized to run or that is operating outside of its permitted context, the ECU can block the process from operating. Automotive ECUs can use any of a variety of different contexts to determine whether a process is operating within its permitted bounds, such as location-based contexts (e.g., GPS location, street, home, work, freeway, parking lot, garage), proximity contexts (e.g., nearby objects, distance to approaching objects, speed and trajectory relative to other moving objects), operational contexts (e.g., driving, parked, current speed, in drive, in reverse, idle), user-related contexts (e.g., connected devices, current infotainment system usage, automated systems enabled by the user, such as cruise control, parking assist, driving assist), and/or other contexts. By using context-based whitelists to determine whether and when to permit particular processes to operate, ECUs can maintain secure operation and prevent the attacks from ever infiltrating the IoT device's infrastructure, such as a car's Controller Area Network (CAN Bus).

ECUs can additionally include modes of operation that define which levels of security, such as whitelists and context-based evaluation, are used at various times to ensure secure operation of an ECU. For example, during a "normal mode" of operation, an ECU may operate using a whitelist alone and may not consider context when determining whether particular processes should be permitted to run. However, during a "safe mode" of operation, the ECU may evaluate context in addition to using whitelists in order to ensure that every permitted process is operating within a permitted context for that process. An ECU may transition from normal mode to safe mode in response to the ECU or other ECUs on the car (e.g., ECU's on the CAN bus) detecting a potential malware threat. Other modes of operations and transitions between modes of operation are also possible.

By focusing on hardening the controllers within IoT devices/systems that are open to external access (via the Internet, WiFi, Bluetooth, etc.)—meaning restricting the operations and behavior of the controllers to a set of expected operations and behaviors—the controllers can be transformed from potential security vulnerabilities into gates that prevent and block hacker attempts to get into the controller's internal infrastructure, essentially stopping hacker attacks on IoT devices. Additionally, levels of security that are used by controllers and resources that are dedicated security (e.g., memory, processor cycles) can be escalated and deescalated according to the mode of operation within which a controller is currently operated, so as to strike a balance between resource usage and corresponding security threat level. Endpoint security layers can stop attacks on controllers by blocking hackers at the gate using modes of operation and context-based whitelists—meaning an externally facing entry point into a device and/or system, such as at externally facing ECUs in an automobile that, if compromised, could provide access to the CAN Bus. As a result, attacks cannot make it inside of an IoT device/system, which can prevent access to and control of an IoT device/system's functions.

Context-based secure controller operation and malware prevention through modes of operation can be integrated through endpoint security clients incorporated into the operating system of controllers programmed to implement one or more security layers, such as whitelist enforcement layers. Whitelist layers can use signatures for binary (and/or script) codes on the system, which kernel modules can be checked against upon execution to verify their authenticity, can include permitted contexts within which the binary codes (and/or scripts) can operate on particular controllers, and can include modes of operation that define which security features are used at various times by a controller. Additional whitelist layers can also be used. When a controller is operating in a mode that uses context as part of the security layer, operation that is detected outside of the approved context included in a custom security policy for a controller, it can indicate that that a malware is attempting exploit a vulnerability (i.e., software bug) on the controller to run unauthorized code in memory, and can be blocked and reported. Such context-based security features may not be used during other modes of operation, such as when the controller is operating in a normal mode of operation.

In one implementation, a system for data communication can be used for the operation of an automobile. The system includes the automobile, the automobile comprising a first electronic control unit (ECU) being directly accessible to external networks that are outside of the automobile; a second ECU that is not directly accessible to the external networks that are outside of the automobile; and a control area network (CAN) bus that communicably couples the first ECU and the second ECU such that the first ECU and the second ECU can pass data communications within the automobile. The first ECU is configured to operation either in a normal mode or in a first safe-mode, wherein in the first safe-mode comprises stricter security policies than the normal mode; while operating in the normal mode, detect an attempted attack on the automobile; responsive to detecting the attempted attack on the automobile, determine that the detected attempted attack is indicative of attempted malicious execution by malware; responsive to determining that that the detected attempted attack is indicative of attempted malicious execution by malware, change modes from the normal mode to the first safe-mode; responsive to determining that that the detected attempted attack is indicative of attempted malicious execution by malware, transmitting over the CAN bus a safe-mode alert. The second ECU is configured to operate in either the normal mode or a second safe-mode, wherein in the second safe-mode comprises stricter security policies than the normal mode and wherein the second safe-mode comprises different security policies than the first-safe mode; while operating in the normal mode, receive the safe-mode alert from the first ECU over the CAN bus; and responsive to receiving the safe-mode alert, change modes from the normal mode to the safe mode. Other systems, methods, devices, and computer-readable devices may be used.

Implementations can optionally include one or more of the following features, which can be combined in each possible sub-combination of features.

The system can further include a plurality of other ECUs; and each of the other ECUs receives, while operating in the normal mode, the safe-mode alert. Each of the ECUs is configured to, responsive to receiving the safe-mode alert, change modes from the normal mode. At least one of the ECUs is configured to change modes to one of the group consisting of the first safe-mode and the second safe-mode. The first safe-mode comprises preventing external network communications while in the first safe-mode. The second safe-mode comprises restricting execution to a whitelist of permitted processes. The first ECU is further configured to, while in the first safe-mode: determine a current context of the first ECU that described the state of operation of the ECU; compare the current context to each of a plurality of permitted contexts of the first ECU, each of the plurality of permitted contexts of the ECU describing a potential state of operation of the ECU in which the ECU should be permitted to perform a given action; perform or deny a proposed given action depending on a match or lack of match between the current context and the plurality of permitted contexts. The first ECU is further configured to, while in the normal mode, perform a given action without consideration of a comparison between the current context and the plurality of permitted contexts. The first ECU is further configured to while in the first safe-mode: restrict the current context of the first ECU to only one of a plurality of predefined permitted contexts. Restricting the current context of the first ECU to only one of a plurality of predefined permitted contexts comprises restricting the automobile from autonomous navigation, wherein autonomous navigation is permitted when the first ECU is in the normal mode. Restricting the current context of the first ECU to only one of a plurality of predefined permitted contexts comprises restricting the ECU from performing a software update, wherein software updates are permitted when the first ECU is in the normal mode. The automobile further comprises a third ECU; the CAN bus further communicably couples the third ECU to the first ECU and to the second ECU such that the third ECU can pass data communications within the automobile; and wherein the third ECU does not include functionality to operate in a safe-mode. Changing modes from the normal mode to the first safe-mode comprises transmitting over the CAN bus the safe-mode alert. The malware comprises computer-readable instructions that, if executed by the first ECU would cause the first ECU to transmit a copy of the malware to the second ECU across the CAN bus; and changing modes by the first ECU prevents transmission of the copy of the malware by the first ECU to the second ECU. The first ECU is further configured to, in the normal mode, permit communications between the first ECU and external destinations outside of the automobile across the external networks; and in the safe mode, prevent communications between the first ECU and the external destinations outside of the automobile across the external networks.

Certain implementations can provide one or more of the following advantages. For example, by using varying levels of security under different modes of operation, controllers can scale resources that are dedicated to security to correlate to the current known security threat to the controller. This can permit controllers to conserve resources (e.g., memory, processor cycles, network bandwidth) that are used to ensure secure controller operation and to allocate additional resources when increased risks are present. For instance, context-based security layers can use additional resources on top of those used to enforce whitelists. When a controller is operating in a normal mode of operation, which can occur when a controller is not currently under attack, the controller may be able to save resources by not using context-based security features. However, in the event that the controller is operating in a safe mode of operation, which may occur when the controller or other controllers have blocked a malware or hacking attempt, those additional resources may be allocated to use context-based features to ensure secure operation of the controller in the face of a current security threat. For instance, by controllers notifying each other of an attack attempt (e.g., ECUs notifying each other of an attack on a vehicle), not only can the security of the controller under attack be increased during the attack, but the overall security of all controllers can be increased during the attack. As another example, in the event that the controller is operating in a safe mode of operation, the controller can enter an automatic mode such that the controller does not accept external network communications, but otherwise continues to operate normally.

Additional and/or alternative advantages are also possible, as described below.

BRIEF DESCRIPTION OF THE ATTACHMENTS

FIG. 4 depicts is an example process whitelist.

Figure 5A:
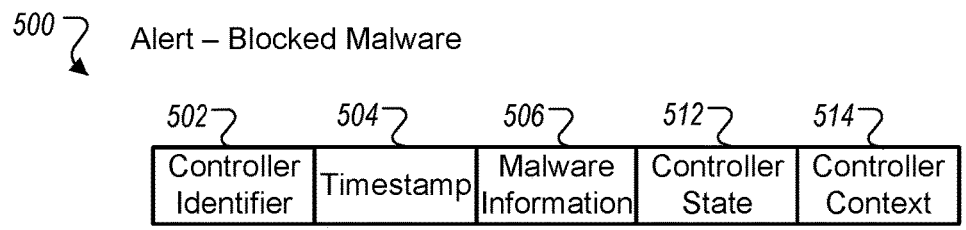
Figure 5B:
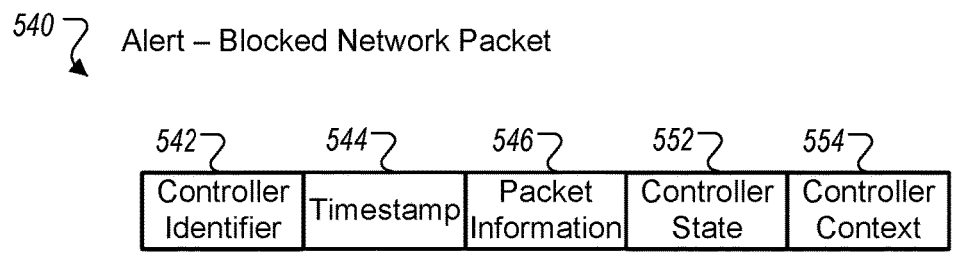
Figure 5C:
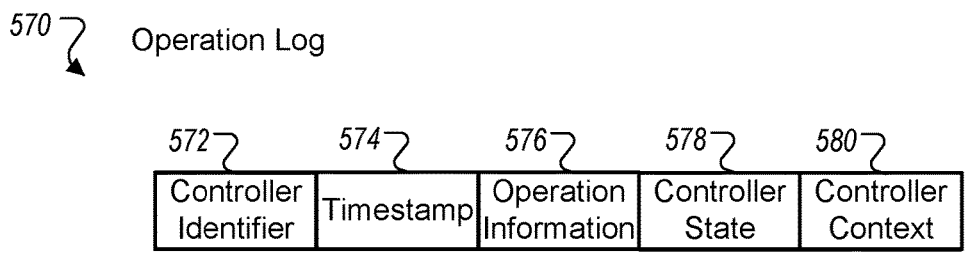

FIGS. 5A-C depict example alert information that can be generated and transmitted.

Figure 6:
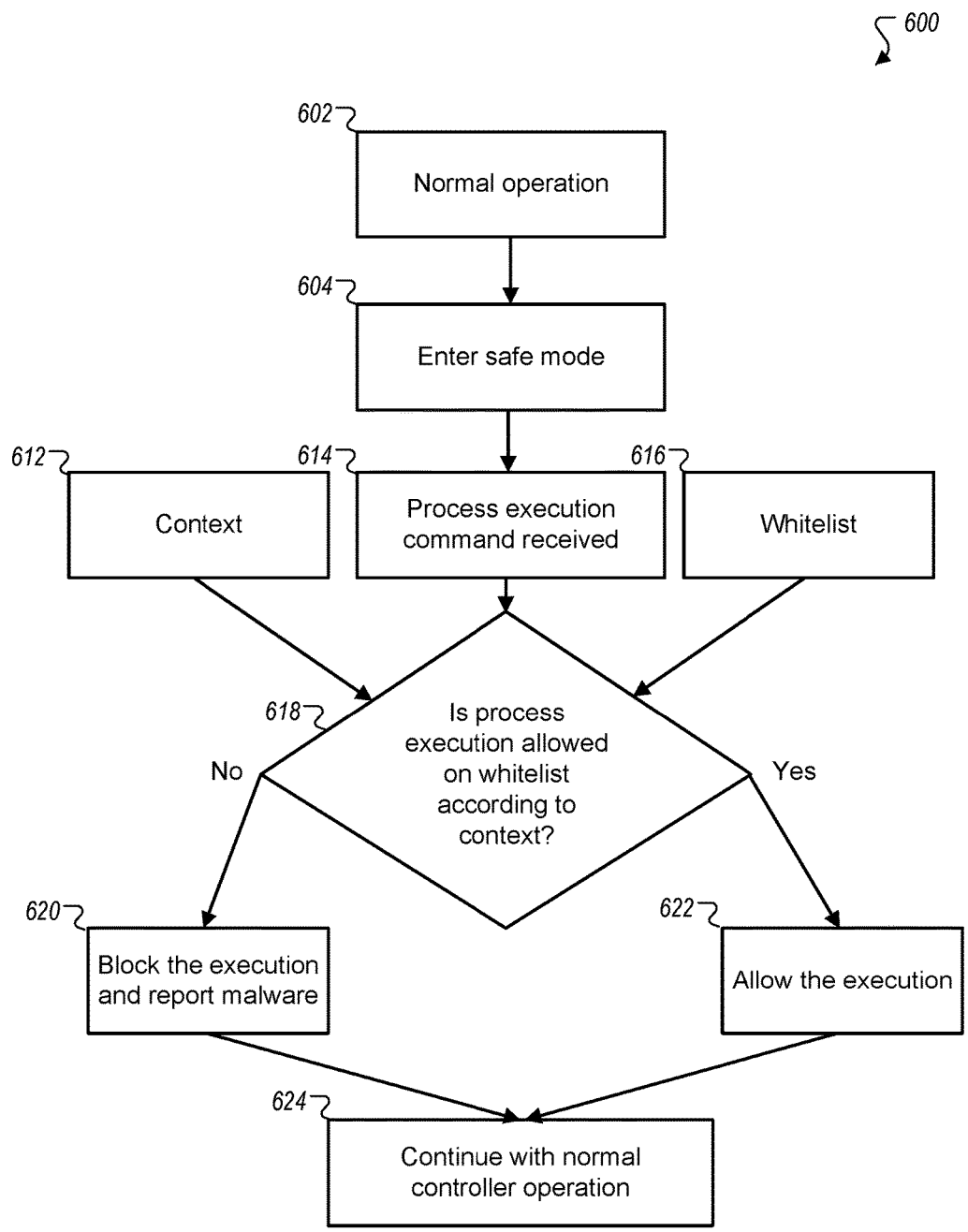

FIG. 6 is a flowchart of an example technique for implementing a context-based whitelist on a controller.

Figure 7:
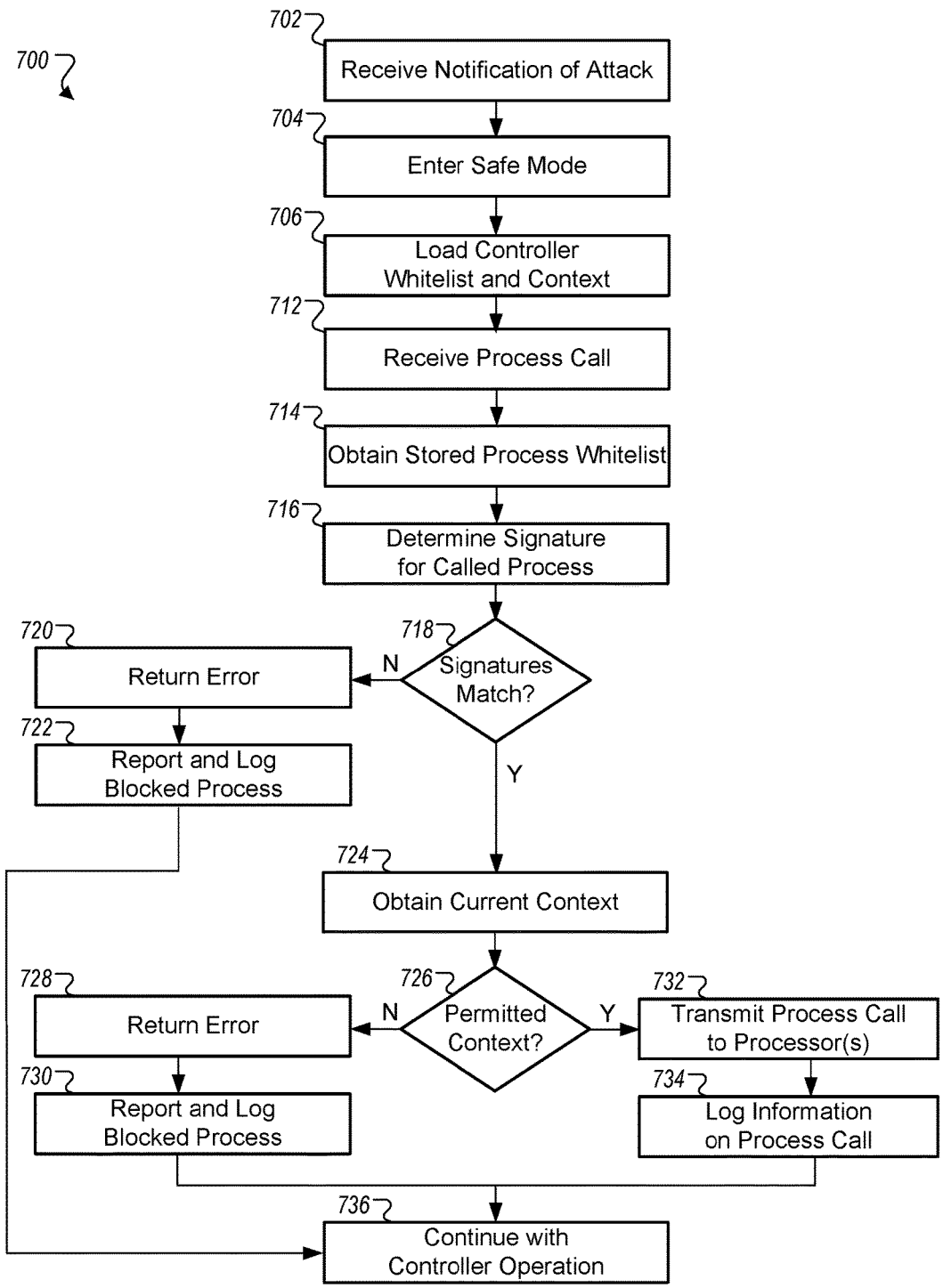

FIG. 7 is a flowchart of an example technique for implementing a context-based whitelist on a controller.

Figure 8:
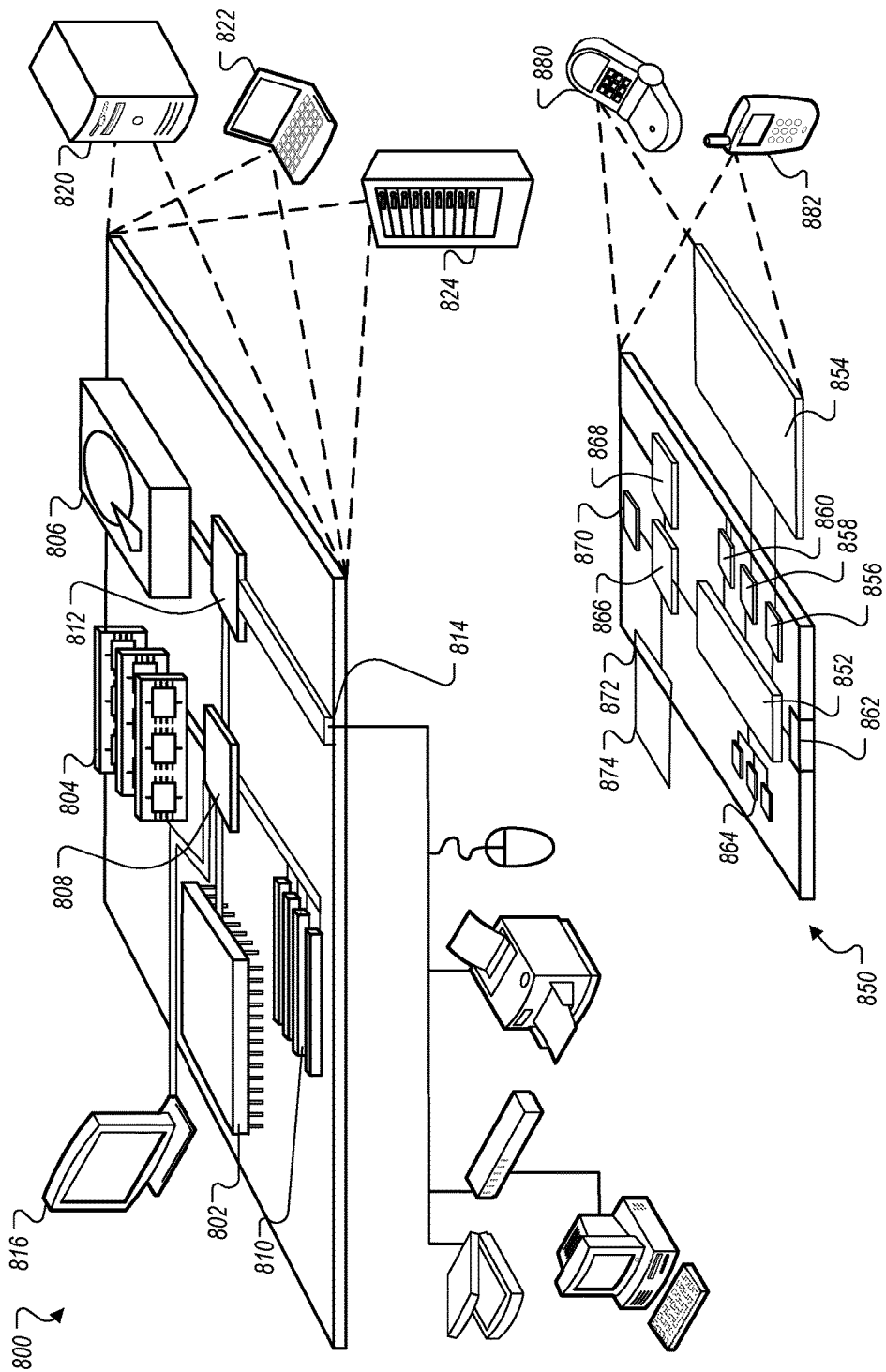

FIG. 8 is a block diagram of example computing devices.

Like reference numbers and designations in the various drawings indicate like elements.

DETAILED DESCRIPTION

Figure 1A:
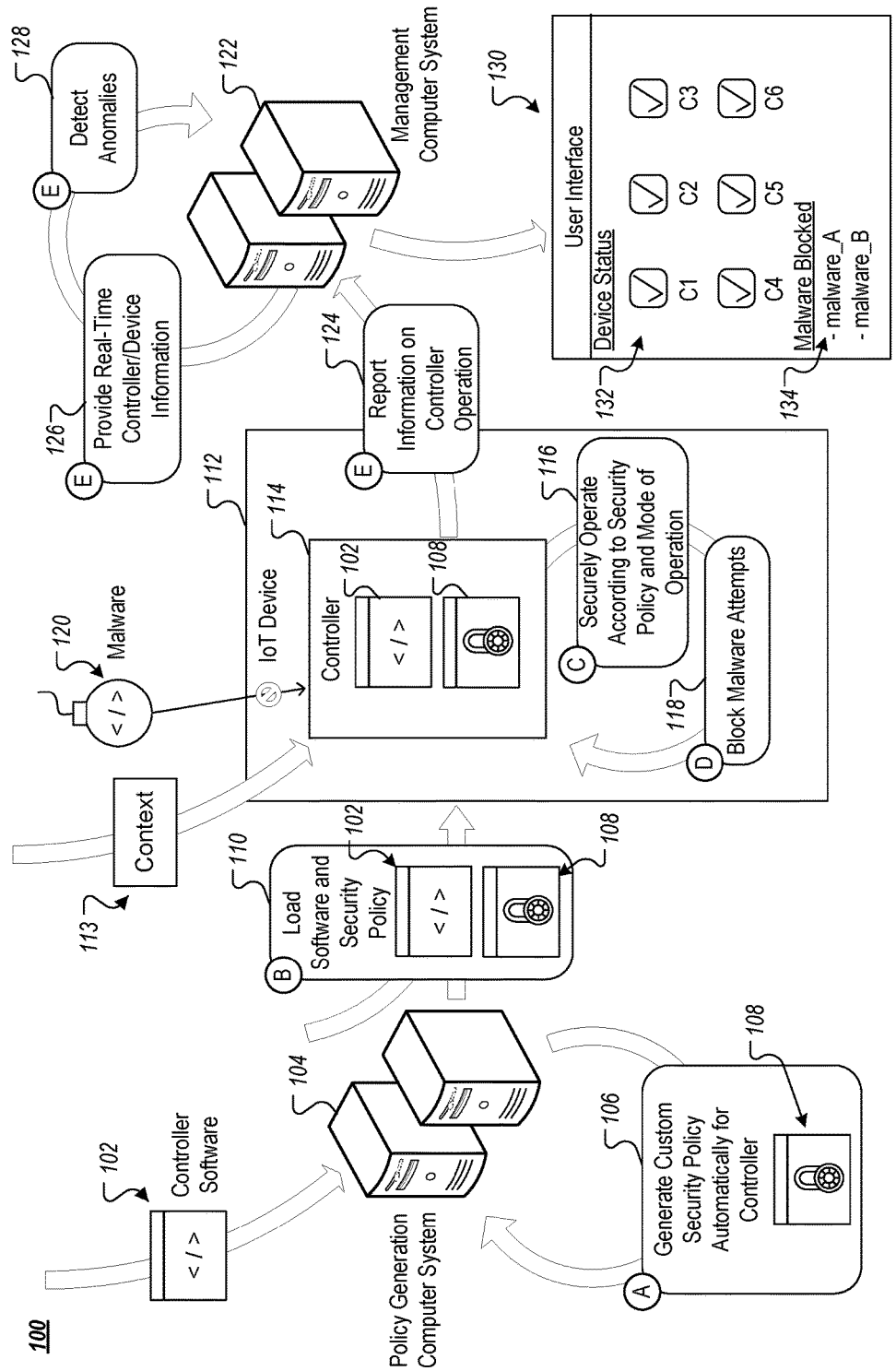
FIG. 1A is a conceptual diagram of an example system for generating and implementing a custom security policy on an example controller using modes of operation.

FIG. 1A is a conceptual diagram of an example system 100 for generating and implementing a custom context-based security policy on an example controller using modes of operation. The example system 100 includes a policy generation computer system 104 (e.g., computer server system, cloud computing system, client computing device) that is programmed to generate a custom security policy for a controller, an example IoT device 112 (e.g., ECU) that includes an example controller 114 that will use the generated security policy to operate securely and to prevent malware, and a management computer system 122 (e.g., computer server system, cloud computing system, client computing device) that is programmed to receive real-time controller information, to detect anomalous controller behavior, and to provide an interface for users to view real-time controller/device status information. Although not depicted, the system 104, the IoT device 112, and the system 122 can communicate over one or more communication networks, such as the internet, local area networks (LAN), wide area networks (WAN), virtual private networks (VPN), controller area networks (CAN), wired networks, wireless networks, mobile data networks, or any combination thereof.

The policy generation computer system 104 can receive controller software 102, which can include an operating system and/or applications that are to be run on a controller. The policy generation computer system 104 can use the controller software to automatically generate a custom context-based security policy 108 (with varying security levels for different modes of operation) for the controller that is to execute the software 102, as indicated by step A (106). For example, the computer system 104 can analyze the software 102 to determine a set of operations and contextual behaviors that are expected during operation of a controller according to the software 102 (e.g., identify a list of authorized binaries, identify a set of contexts within which each of the binaries are authorized to operate) and can incorporate those operations and contextual behaviors into the custom security policy 108, which may include one or more whitelists of permitted operations and/or behaviors, and one or more levels of security based on the mode of operation. Generating the security policy can additionally include generating one or more signatures for components of the controller software 102, such as processes/functions that are part of the software 102, and that can be used to verify that the code being executed as part of the software 102 is authentic and has not been modified/altered/replaced by malware. By automatically generating a security policy 108 from the controller software 102—meaning without needing manual design for implementation/generation—the system 100 can reduce the burden, cost, and time to generate and implement security layers on controllers, which can increase controller security.

The policy generation can be performed by the computer system 104 in a way that does not necessitate any sort of modification to the controller software 102. For example, the custom policy 108 can be separate from and not rely on modification of the software 102 in order to operate. By generating and implementing the security policy 108 without having to modify or alter the controller software 102, the system 100 can additionally reduce the burden on security layer implementation, which can increase security layer implementation and overall controller security. For example, if the controller software 102 were to be modified in significant ways in order to incorporate the security policy 108, the software 102 would need to be verified and tested again after the security policy 108 has been integrated into the system, which can slow time to deployment and can delay the incorporation of security layers on controllers.

The computer system 104 (and/or other computer systems, such as original equipment manufacturers (OEM)) can load the software 102 and the security policy 108 for the controller 114 of the IoT device 112, as indicated by step B (110). For example, the controller software 102 and the security policy 108 can be flashed onto the controller 114.

The controller 114 can securely operate using the controller software 102, which is confined to operating within the confines of the security policy 108 based on the current mode of operation for the controller 114, as indicated by step C (116). For example, the security policy 108 can include rules outlining various security features to use during particular modes of operation. For instance, during a normal mode of operation, the controller 114 may conserve resources and operate using just a whitelist to verify that only authorized processes are executed by the controller 114. However, during a safe mode of operation, the controller 114 may add security features, such as additionally operating using the context-based security features. For example, the security policy 108 may include whitelists (and other information) that designate authorized contextual behaviors and operations for the controller 114 that are within expected behavior given a current context 113 for the IoT device 112, according to the controller software 102. The context 113 can be determined by the controller 114 based on information received and/or detected about the current state of the IoT device 112 and its surroundings, such as through information detected by sensors/devices (e.g., proximity sensors, accelerometers, gyroscopes, GPS chipset), obtained from other controllers and/or devices (e.g., infotainment system, navigation system, other onboard systems, vehicle-to-vehicle communication network, remote computer system, other external devices/systems). Behaviors/operations that deviate from those authorized behaviors/operations, when the controller 114 is operating in a mode to check contextual behaviors (such as in safe mode), can be prevented from occurring based on the security policy 108 (e.g., authorized processes, authorized contexts for the processes to operate within) hardening the controller 114 against such behaviors/operations.

For example, the controller software 102 can include one or more portions of code that make the controller 114 unsecure, which can potentially affect the security of not only the controller 114 but the device 112 (and other devices to which it is connected). Security vulnerabilities can come in any of a variety of different types, such as buffer overrun vulnerabilities through which a hacker could potentially modify the software stack to cause malware 120 to be loaded onto and executed by the controller 114. By operating according the security policy 108 on the controller 114, such malware attempts can be blocked before the malware 120 is loaded/executed by the controller 114, as indicated by step D (118). For example, if the IoT device 112 is an ECU on an automobile, the policy 108 can define a particular set of processes that are authorized and a particular set of contexts within which those processes on the automobile can be executed by the controller 114. For instance, an automatic parking process that automatically parks a car (e.g., parallel parking) may be restricted to particular contexts for the automobile, such as the automobile being stopped and being located on a street or in a parking lot. The whitelist can then restrict execution of the automatic parking process to contexts that are permitted (e.g., car stopped, car located on street or in parking lot), and can block attempts to execute the process outside of the whitelisted contexts (e.g., block attempts to execute the automatic parking process when the car is travelling at a high rate of speed or is located on a highway). Processes being executed outside of their expected contexts (when the controller 114 is in a mode that uses context-based security features) can indicate a possible malware or hacking attack, and can be blocked by the controller 114 using the security policy 108 (defining permitted contexts) before the attempts are able to take root on the controller 114.

Such hardening of the controller 114—meaning restriction of the controller 114 to specific behaviors/operations outlined in the security policy 108 according to the mode of operation—can provide endpoint security that provides a variety of benefits. For example, it can allow for early warning of attacks by identifying attack attempts before they are able to install/run the malware 120 on the controller 114. It can also stops attacks at the gate—meaning preventing attacks from making it onto the controller 114 and the device 112 (as opposed to other security solutions that attempt to identify malware once it has already been installed/run on a controller). It can eliminate false positives (incorrect identification of attacks) by restricting operation of the controller 114 to only the code and applications that have explicit permission to run on the controller, which can eliminate potential ambiguity (e.g., either the code is part of the factory settings or not). It can also eliminate risk of the policy 108 becoming security vulnerability itself by being outdated. For instance, by custom generating the security policy 108 to match the current version of the controller software 102, the security policy 108 can continue to harden the controller 114 as the controller software 102 is updated over time. Additionally, this is in contrast to other security policies that may use blacklists seeking to identify and prevent particular malware. Such blacklists may require constant updating and may continually run the risk of being outdated, which can expose the controller 114 to potential vulnerabilities. By using whitelists in the security policy 108 that outline permitted behaviors/operations, the security policy 108 can continue to protect the controller 114 even when new and yet unknown malware attempts are launched against the controller 114 and device 112. Quality checks can also be minimized, which can reduce time for deployment and updates. For example, endpoint security layers can be isolated within the controller 114, so there may not be a need to rest the operation of the entire device 112 (or other devices connected to the device 112) as part of the security layer deployment.

The controller 114 can log information about its operation, including blocked malware attempts as well as information on secure operation of the controller 114 over time, including contexts for the controller 114 and the device 112 while various processes are executed, and the mode of operation that the controller 114 and/or the device 112 were operating in. Traces of blocked malware attempts can include a variety of information, such as the malware itself, the origin of the malware (e.g., IP address from which the malware originated), the context of the device 112 and/or controller 114 when the malware attempt was blocked, the mode of operation for the device 112 and/or the controller 114, and information identifying the code segment that provided the malware exploit. The controller 114 can report information on controller operation, as indicated by step E (124). Such reporting can be provided in real-time. For example, the controller 114 can report malware traces in response to the malware 120 attempt being blocked. The controller 114 can balance reporting with controller performance against the timeliness of reporting for less critical information, such as information about secure operation of the controller 114 during periods of time when no malware attacks were attempted/blocked. For instance, such reports can be delayed until periods of time when the controller 114 and/or the device 112 have at least a sufficient amount of processing capacity and/or network bandwidth available.

The management computer system 122 can receive reports from the controller 114 as well as from multiple other controllers and devices, and can aggregate the reports into a central database system. The reports can be used to provide real-time controller/device information, as indicated by step E (126). For example, the computer system 122 can transmit real-time information that is presented on client computing devices (e.g., mobile computing devices, laptops, desktop computers) in user interfaces, such as the example user interface 130 that includes status information 132 for example controllers C1-C6 and malware information 134 that identifies particular malware that has been blocked by these controllers, as well as other information (e.g., device/controller context when the malware was blocked). The real-time information can be at any of various levels of granularity, such as a device-level (status information for a specific device) and/or a population-level (status information across multiple devices/systems).

The computer system 122 can additionally use the information reported by controllers to detect anomalies, as indicated by step E (128). For example, the computer system 122 can use statistical analysis to identify operation/behaviors that are outside of the normal operation of a controller, such as identifying a particular context for a particular process that is a statistical outlier outside of the normal operation of a controller.

Figure 1B:
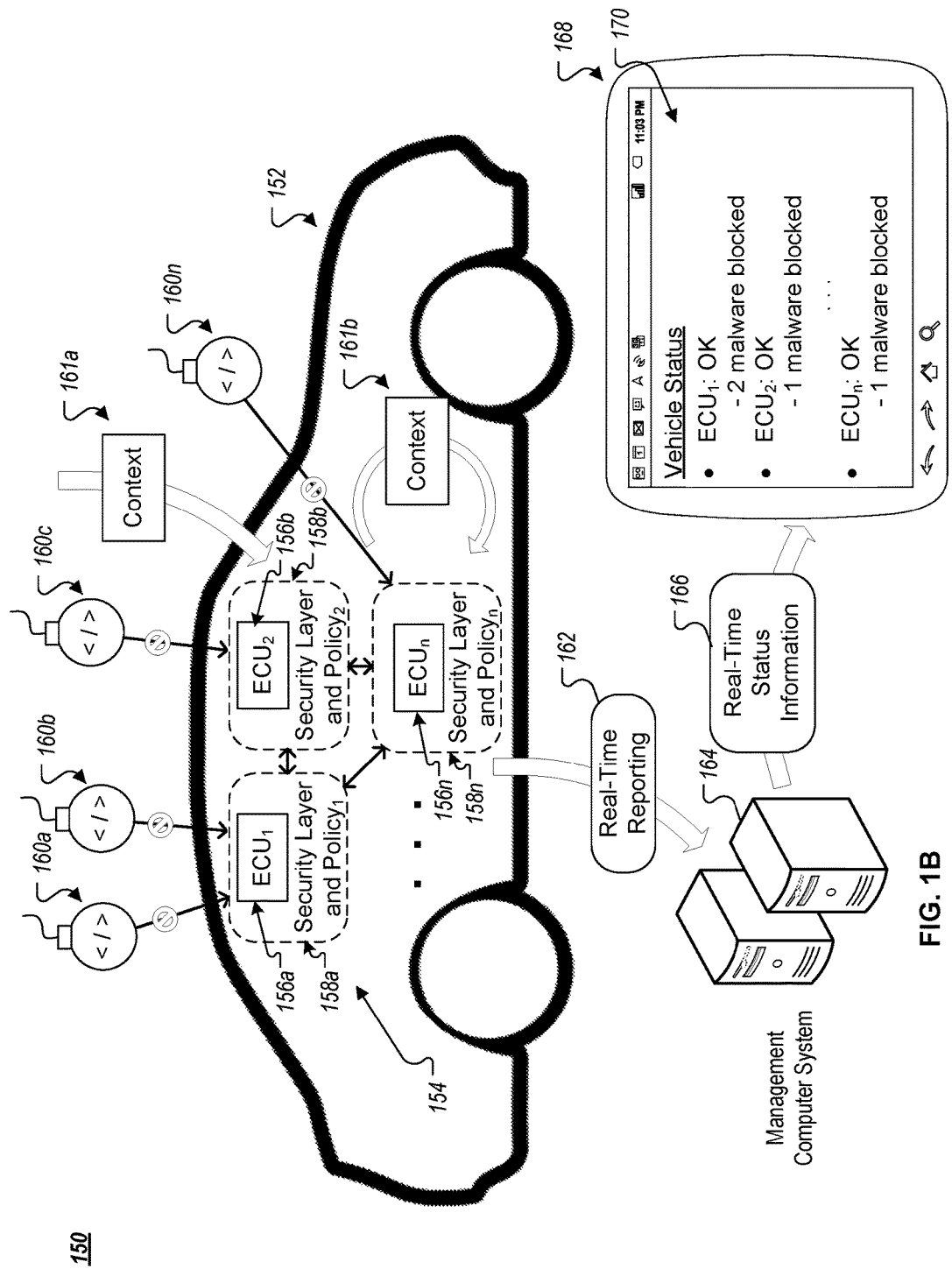
FIG. 1B is a conceptual diagram of an example system for generating and implementing custom security policies on example ECUs that are part of an example vehicle.

FIG. 1B is a conceptual diagram of an example system 150 for generating and implementing custom context-based security policies on example ECUs that are part of an example vehicle 152. The example system 150 is an example implementation of the system 100 to a specific IoT context, which in this example is the vehicle 152. The system 100 and the system 150 can be implemented on a variety of other IoT devices and systems.

In this example, the vehicle 152 includes a control system 154 that includes multiple ECUs 156a-n that each have their own custom security policy 158a-n, which each define authorized processes and authorized contexts for the processes. Although not depicted, the security policies 158a-n can be generated in a similar manner described above with regard to FIG. 1A and the policy generation computer system 104. The security policies 158a-n can harden the ECUs 156a-n and can effectively block malware attempts 160a-n, which can be attempts by hackers to find a way into the CAN Bus of the vehicle 152. While the vehicle 152 can include over a hundred ECUs connected to the CAN Bus, only a few may be open externally (accessible to external networks outside of the vehicle 152, such as the internet). These external ECUs (e.g., ECUs 156a-n) can be the gateways into the car and the security policies 158a-n can stop attackers at these gateways, which can significantly reduce, if not eliminate, the risk of attacks penetrating the car's network, which can disrupt the car's operation.

For example, the security policies 158a-n can include whitelists for permitted program binaries, processes, scripts, network behavior, and/or other devices, and can be embedded within the ECUs 156a-n to ensure only explicitly allowed code and contextually-approved behaviors for the code may run on it under various modes of operation. By using the security policies 158a-n that are specific to the ECUs 156a-n, any processes or functions that are outside of the ECUs permitted/designed operating behavior can be immediately detected and stopped from running on the ECUs 156a-n. This can allow for the ECUs 156a-n to stop malicious code from ever being executed by and possibly taking control of an ECUs' operation.

For instance, hackers targeting the vehicle 152 can use a "dropper," which is a small piece of code or operation, to try to exploit a vulnerability and implant the malware 160a-n. The malware 160a-n is the code that ultimately tampers with or takes control of the function of the vehicle 152, which can cause significant damage and put the safety of the driver and others on the road at risk. By adding an endpoint security layers and policies 158a-n to ECUs 156a-n so that they use policies outlining whitelists of permitted processes, binaries, etc., and outlining permitted contexts within which the permitted processes are able to operate, the ECUs 156a-n are able to detect the unexpected behavior or operation of a dropper and immediately report on the attack attempt in real-time, as indicated by step 162. The early warning can give the original equipment manufacturers (OEMs) and system providers of the vehicle 152 (and its subparts) time to address the threat, as indicated by the computer system 164 providing real-time status information to a client computing device 168 with information 170 on malware that has been blocked across the ECUs 156a-n (step 166). For example, an alert on the malware 160a-n can include the complete trail of the attack on the ECUs 156a-n, including its source, path, and context of the vehicle 152 and/or ECUs 156a-n when the attack was blocked, so vulnerabilities can be fixed and blocked to prevent any malware from infiltrating the CAN Bus on the vehicle 152.

Dropper and other hacker attempts to introduce the malware 160a-n on the externally connected ECUs 156a-n can be detected by the endpoint security layers and policies 158a-n as foreign code based on external contexts 161a and/or internal contexts 161b for the vehicle 152, and can be blocked when they attempt to run depending on the mode of operation for the ECUs 156a-n. External contexts 161a can include, for example, the position and movement of the vehicle 152 with regard to other objects (e.g., nearby vehicles, nearby buildings, intersections) and/or location information (e.g., global position, relative location for user, such as home, work, garage). Internal contexts 161b can include, for example, the use and status of systems within the vehicle, such as infotainment and navigation systems, and the status of other controllers within the vehicle 152. For instance, such droppers and other hacker attempts are not part of the factory settings for the ECUs 156a-n and/or that are attempting to operate processes on the ECUs 156a-n that are outside of their permitted contexts, when the ECUs 156a-n are operating in modes that involve context-based security features, can be blocked from running by the security layers and policies 158a-n, which can stop them from running and prevent them from doing anything to disrupt the safe operation of the vehicle 152. If a dropper does succeed in dropping the malware 160a-n onto the externally connected ECUs 156a-n, when the malware 160a-n attempts to run on the ECUs 156a-n, the endpoint security layer and policies 158a-n can detect it as foreign code and block its attempts to run.

For example, the security policies 158a-n for the ECUs 156a-n can define use context-based security features to particular modes of operation, such as a safe mode of operation (and may not use context-based security features in other modes of operation, such as a normal mode of operation). The vehicle 152 and its ECUs 156a-n can enter a safe mode, for example, in response to one of the ECUs 156a-n detecting an attack attempt (in addition to the vehicle 152 reporting on the attack attempt). In response to detecting an attack attempt, for example, the ECU 156a can enter a safe mode which restricts the external contexts 161a and/or the internal contexts 161b in which the ECU 156a is permitted to operate, to a subset of the contexts. When in safe mode, the ECU 156a may restrict a particular process performed by the ECU 156a to be permitted only when a context of the vehicle 152 matches a context included in the subset of contexts associated with safe mode for that process. Before entering into safe mode, however, the ECU 156a may have been operating in a normal mode of operation in which the ECU 156a did not evaluate the permissibility of processes based on context. Restricting the contexts to a subset of contexts when in safe mode can include restricting the contexts based at least in part on location. For example, a self-parking process may normally be permitted by the ECU 156a when the vehicle 152 is stationary. When in safe mode, however, the self-parking process may only be permitted by the ECU 156a when the vehicle 152 is stationary and when the vehicle 152 is at a driver's destination. As another example, a software update process may normally be permitted by the ECU 156a when the vehicle 152 is not running. When in safe mode, however, the software update process may only be permitted by the ECU 156a when the vehicle 152 is not running and when the vehicle 152 is located in an authorized garage. In general, a restricted subset of contexts appropriate for safe mode operation can vary per ECU and/or per process. For example, each of the ECUs 156a-n may include different safe mode instructions in their respective security layer and policies 158a-n, that are determined (e.g., by an engineer) as being appropriate for the ECU. As another example, some ECUs may include particular safe mode instructions, and others may not.

Entering safe mode can include transmitting a safe mode alert to one or more other ECUs included in the vehicle 152, in response to detecting an attack attempt on a particular ECU. For example, after detecting an attack attempt on the ECU 156a, the ECU 156a can enter safe mode, and can transmit a safe mode alert (e.g., over a CAN Bus) to each of the ECUs 156b and 156n. In response to receiving the safe mode alert, for example, each of the ECUs 156b and 156n can also enter safe mode, restricting the external context 161a and/or the internal contexts 161b in which the respective ECU is permitted to operate, to a subset of contexts that is appropriate for the ECU. When in safe mode, for example, each of the ECUs 156b and 156n can restrict processes to being performed only within permitted contexts for the vehicle 152 as defined by the security policies 158b-n for the ECUs 156b-n when in safe mode. Safe mode operation for the vehicle 152 including the ECUs 156a-n, for example, can include entering an automatic mode which includes shutting down communications from external network sources but otherwise operating normally, and may continue until such time that a security threat is mitigated or eliminated. For example, safe mode may continue until the vehicle 152 is restarted, and each of the ECUs 156a-n and corresponding security layer and policies 158a-n is reloaded. By providing notification of an attack attempt on one ECU to other ECUs in the vehicle 152, which can additionally include a dashboard or technique for notifying the vehicle's operator of the security threat, not only the security of the ECU under attack, but the vehicle's overall security can be increased during the attack. Additionally, safe operation of the vehicle 152 can be ensured during the attack.

Endpoint security layers (e.g., security policy 108, security layer and policies 158a-n) can be implemented on newly deployed controllers and can be retrofitted on previously released controllers that may not have previously included security layers. Such retrofitting can improve the security of devices already in use and can be added as part of regular software updates that drivers receive during regular maintenance and updating. Once retrofitted, previously deployed controllers can be protected with endpoint security and will be hardened against the cyber threats targeting them.

Figure 2:
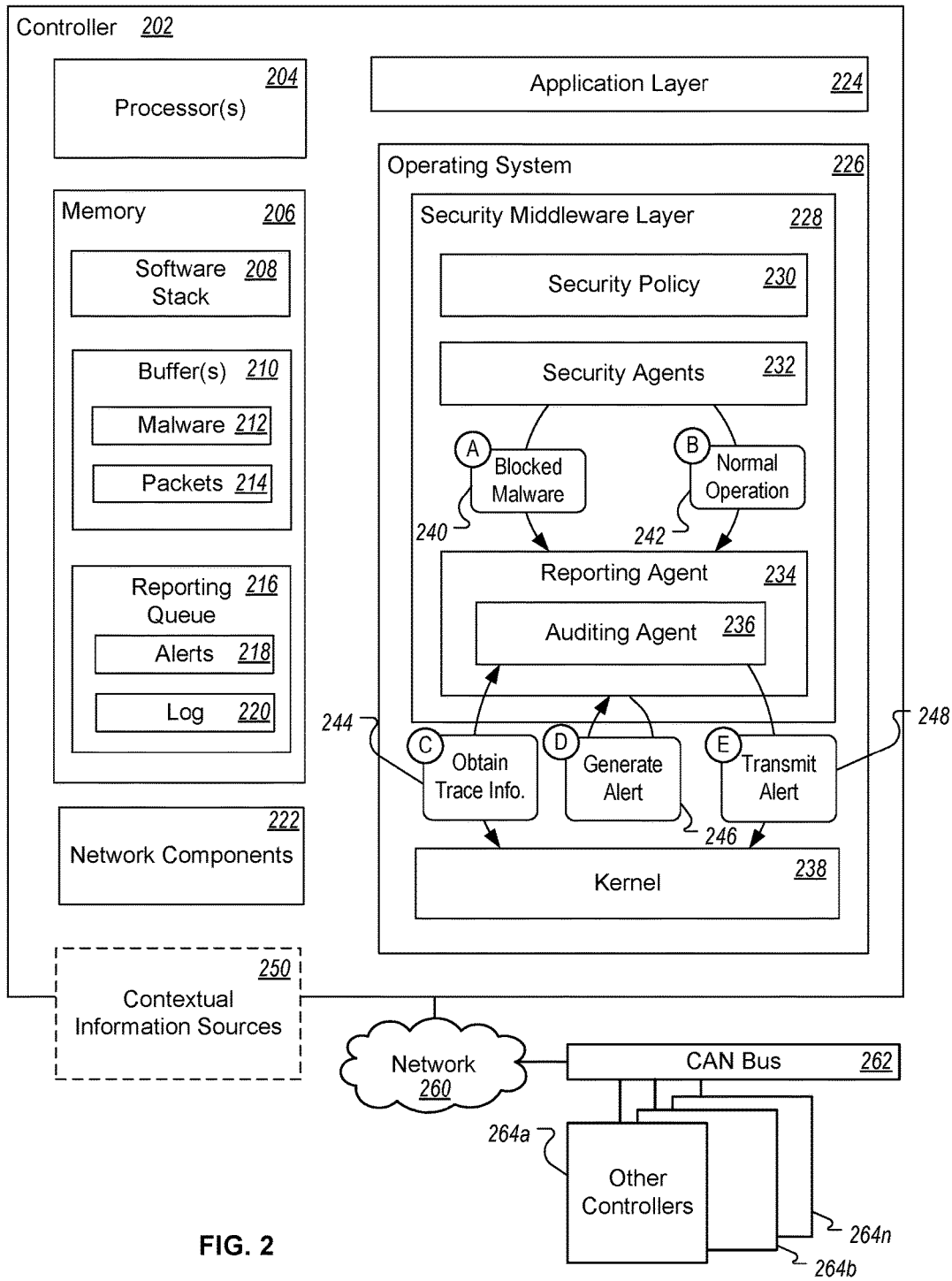
FIG. 2 is a diagram of an example system for processing and providing controller security information.

FIG. 2 is a diagram of an example system 200 for processing and providing controller security information. The example system 200 includes a controller 202 that can be similar to the controller 114 protected by security policy 106 and the ECUs 156a-n protected by security policies 158a-n described above with regard to FIGS. 1A-B.

The controller 202 includes an application layer 224 at which one or more applications operate on the controller 202 through use of an operating system 226 for the controller 200. The operating system 204 includes a kernel 238 and the security middleware layer 228, which can restrict operation of the kernel 238 to only known, authorized, and safe services that are authorized by a custom security policy 230 for the controller 202. The kernel 238 includes processes and functions that provide an interface for the operating system 226 to perform operations on the controller 202 using hardware, which includes one or more processors 204 (e.g., CPUs), memory 206 (e.g., volatile memory, non-volatile memory, RAM), and input/output (I/O) network components 222 (e.g., wired and wireless network cards/chip sets, network interface cards (NIC)). The kernel 238 includes functions/process that direct operation of the hardware, such as program loading (e.g., functions and processes to load processes into a software stack 208 in memory 206 for execution by the processor(s) 204), in-memory services (e.g., functions to allocate information into and out of memory 206), networking services (e.g., processes to open network sockets and to transmit/receive network packets), and peripheral device processes (e.g., processes to interface with peripheral devices).

The security middleware layer 228 includes security agents 232 that can provide multiple different layers of security and that can implement various portions of the security policy 230 on the controller 202 based on the mode of operation for the controller 202. The security agents 232 can, for example, verify processes that are preformed and network packets that are transmitted/received by the controller 202 when operating in a normal mode of operation. The security middleware layer 238 additionally includes a reporting agent 234 that can collect and report forensic information and alerts on security threats, such as malware dropping attempts, as well as information on normal operation of the controller 202. The security middleware layer 228 can harden the controller 202 against malwares and other security threats, and can be integrated into the operating system 226 of the controller 202, in kernel and system levels, which can include enforcement as well as reporting and forensics capabilities through the reporting agent 234. For example, the security middleware layer 228 (and/or its individual components) can be registered as one or more drivers with the kernel 238 to be executed in response to various action being performed at a kernel level, such as particular functions that are part of the kernel processes being called.

The reporting agent 234 can incorporated into the security middleware layer 228 by, for example, being invoked/called by the security agents 232 whenever the security agents 232 block malware attacks, as indicated by step A (240), and/or whenever they determine that the controller is operating normally (no malware attack detected), as indicated by step B (242). The reporting agent 234 can collect forensic trace information on system workflows within the controller 202. This collection can be automatically adjusted and optimized based on controller 202 performance, memory usage, and/or storage limitations. The reporting agent 234 can be designed to obtain and report relevant information, but to also do so while minimally impacting performance of the controller 202. Periodically and upon attack attempts, the forensic information is reported to a server system (e.g., management computer system 122, management computer system 164) for reporting and further analysis and/or is used for generating alerts and providing the alerts to one or more other controllers (e.g., other controllers 264a-n, in communication with the controller 202 over the CAN Bus 262 and the network 260).

For example, the reporting agent 234 can automatically analyze attack attempts (blocked malware 240), including identifying the attacker's entry point (exploit in the operating system 226) and reporting that information to the vendor to be addressed and fix the vulnerability. The reporting agent 234 can further include an auditing agent 236 that is an internal component that collects activity traces, stores them in a queue 216 (e.g., compressed cyclic buffer) for transmission, and sends them, when needed, to the backend server system (management computer system 122, management computer system 164), which may reside on either a security provider's data center or at a vendor/manufacturer's data center.

For example, in response to receiving an indication that malware has been blocked (240) and/or that the security agents 232 have determined the controller 202 is operating normally (242), the reporting agent 234 can request the auditing agent 236 to obtain trace information, as indicated by step C (244). Obtaining trace information can involve the auditing agent 236 transmitting requests to the kernel 238 for information that is stored in memory 206, including information contained within the software stack 208 indicating processes that are being performed by the controller 202 (as well as a sequence of processes that are being performed) and/or information that has been blocked by the security middleware layer 228 that is stored in one or more buffers 210 used by the controller 202 (e.g., blocked malware 212, blocked network packets 214).

The auditing agent 236 can additionally call to the kernel 238 to obtain information on the current state of the controller 202, such as current resource usage (e.g., processor 204 usage, memory 206 usage, network transmission levels using the networking components 222) and/or current network connections established by the network components 222 (e.g., Wi-Fi, cellular network).

When operating in a safe mode, for example, the auditing agent 236 can additionally call to the kernel 238 to obtain information on a current context within which the controller 202 currently exists/resides, which can be a broader external state beyond than the current internal state of the controller 202. For example, the current context can include information about a device/system that the controller 202 is controlling (e.g., infotainment center in a vehicle), information about a broader system of which the controller 202 is a part (e.g., collection of ECUs that together provide control operations within a vehicle), and/or other appropriate information. Obtaining context information may include accessing contextual information sources 250 through the kernel 238. Contextual information sources 250 may be local to the controller 202 or they may be external, such as being provided by one or more other controllers that are part of a system that the controller 202 is a part of (e.g., collection of ECUs in a vehicle). Such information can include, for instance, a current physical location (e.g., geolocation), a current operational state of the system (e.g., vehicle driving, vehicle idling), and/or other appropriate context information.

Having obtained relevant information, the reporting agent 234 and the auditing agent 236 can generate an alert (for blocked malware attempts), as indicated by step D (246). Alerts, for example, can be used to provide information to a backend system (management computer system 122, management computer system 164) about a current state of the controller 202, which can be combined with information from other controllers to provide a global view of the security state of a population of controllers/devices. As another example, alerts can be provided over the network 260 to one or more other controllers 264a-n that are connected to the controller 202 by the CAN Bus 262. In response to receiving one or more alerts 218 from the controller 202, for example, another controller (e.g., one or more of the other controllers 264a-n) may enter a safe mode in which operations are restricted to a subset of normal operations, until such time that any possible security breach can be resolved.

Generated alerts can be transmitted (e.g., to one or more other controllers and/or a backend system), as indicated by step E (248). For example, the alerts 218 can be loaded into the reporting queue 216 and the log entries 220 can be loaded into a reporting queue 216. The reporting queue 216 can be designed to handle alerts 218 differently than log entries 220, and may prioritize the transmission of the alerts 218 over the log entries 220. For example, the reporting queue 216 can transmit the alerts 218 immediately upon receiving them and regardless of a current capacity of the network components 222. In contrast, the log entries 220 (detailing normal behavior) can be entered into a buffer that is flushed at appropriate times, such as when the network components 222 have sufficient capacity to transmit the contents of the buffer. The buffer may have a limited or fixed size, and allow for non-transmitted log entries not yet transmitted to be overwritten with new log entries in the event that the network components 222 did not have sufficient capacity while the non-transmitted log entries were awaiting transmission in the buffer. Since log entries 220 are not as critical as the alerts 218, losing some log entries 220 in order to reduce performance impacts on the controller 202 (e.g., minimize memory usage for log entries 220, restrict network transmissions to times when the networking components 222 have sufficient capacity) can be a fair tradeoff. In contrast, alerts 218 can be prioritized and may not be dropped in lieu of system performance gains.

In addition to including a variety of information, such as trace information, controller information, and/or context information, the alerts 218 can include actual copies of the blocked malware 212 and/or blocked network packets 214. Such information can be used by the backend system to better understand the security threat that was blocked and the exploit in the operating system 226 that permitted the security threat to reach the controller 202. As another example, alerts 218 that may be provided to the other controllers 264a-n may exclude copies of the blocked malware 212 and/or blocked network packets 214, as such information may not be used by the other controllers 264a-n.

Although not depicted, the reporting agent 234 and the auditing agent 236 can additionally include features to compress the size of alerts and logs that are transmitted to the backend system. For example, the reporting agent 234 and the auditing agent 236 can compress the information being transmitted using one or more data compression techniques, such as through using a dictionary to abbreviate particular common bits of information with less information. Other compression techniques can also be used.

Figure 3:
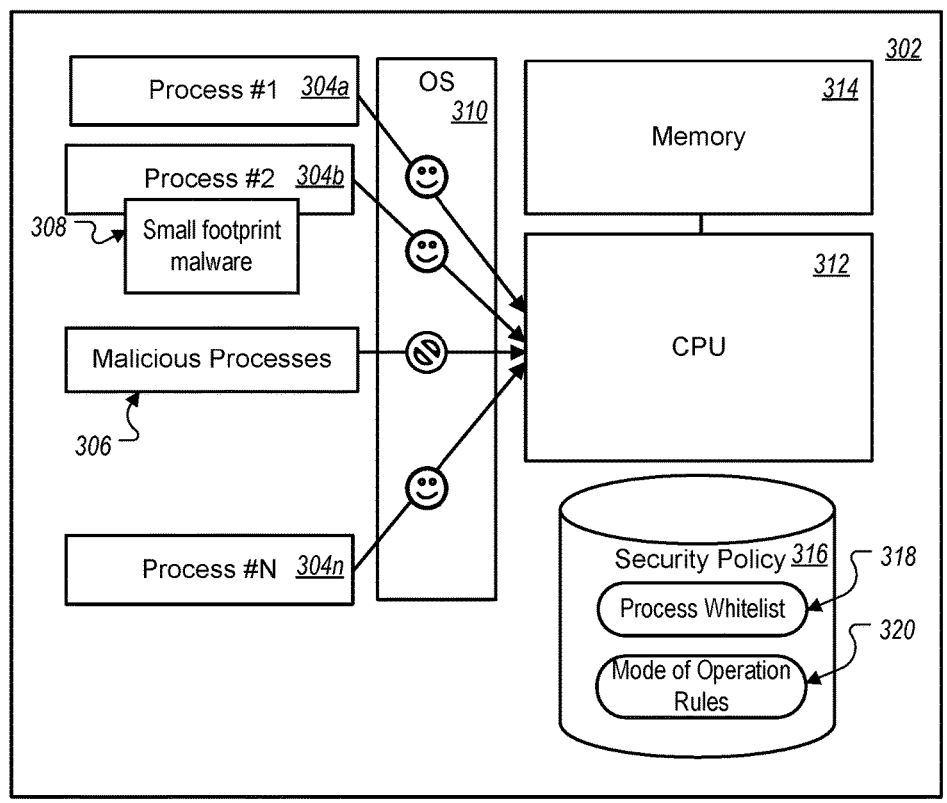
FIG. 3 depicts an example implementation of process verification by a security middleware layer on a controller, such as an example of a running environment in a typical car controller.

FIG. 3 depicts an example implementation of process verification by a security middleware layer on a controller, such as an example of a running environment in a typical car controller. An example system 300 is depicted with an example controller 302 using a whitelist 318 (e.g., process signatures, process contexts) that is part of a custom security policy 316 for the controller 302 to block a malicious process 306. In this example, the processes #1-#N (304a-n) are included on the whitelist 318 for the controller 302 and are operating within their permitted contexts, but the process #2 has a known exploit that is used by hackers to implant a small footprint malware 308 that then, if executed, could download a larger malicious binary that may be launched as a privileged process. A whitelist security agent that is part of a security middleware layer that is implemented by the OS 310 can block the small footprint malware 308 and the larger the malicious process 306 from being executed by the controller 302 because they are not included in the whitelist 318 and/or they are attempting to operate the process 304*b* (with a known exploit) outside of its permitted context— effectively blocking the malicious process 306 and the small footprint malware 308 from being executed by the CPU 312 and used to corrupt the memory 314 (e.g., buffer overrun attack).

For example, the whitelist 318 can include permitted contexts among the whitelisted processes/programs/binaries/scripts/etc. that can be referenced to determine whether operations being performed by the controller 302 are within the expected/known parameters and should be permitted or blocked. The security middleware layer can, for example, integrate with the OS 310 program loading and file access services. The security middleware layer can perform whitelist operations for any of a variety of processes and/or applications, such as executable files, shared objects (libraries), scripts, and/or other binaries/objects that are executable by the controller 302. For example, every time a process (e.g., an executable file, a shared object (library), a script, and/or other binary/object) is loaded, the process's SHA256 signature can be calculated and compared to a database of approved process signatures (whitelist 318), and the context for the controller 302 can be determined and compared against a list of approved context within which the process can be executed by the controller 302. If the process is approved, it will be allowed to run and will run normally on the controller 302 without any interference. If a process's signature does not exist in the whitelist database 318, the loading process can be aborted and an appropriate audit log entry can be written.

The incorporation of contextual-based authentication of processes on the controller 302 can provide a variety of advantages over whitelists that do not incorporate contexts. For example, binary process authorization through whitelists can be binary—either the process is authenticated or it is not—and may not be granular enough in the sense that processes load binary libraries, textual scripts and configuration files as part of their normal functionality. Moreover, processes use OS 310 resources such as hardware devices and network ports without guaranteeing their authenticity. This can create an attack vector to replace such a binary library, text file or OS resource with a malicious one, and have the whitelisted-verified process execute it naively and unknowingly perform a malicious action.

Given that whitelists can be deterministic by nature— meaning, a binary process can either run or not run—context can be used to allow the vehicle to better determine whether a process is behaving correctly based on the vehicle's operational state. For example, some processes should only be allowed to run when the car is starting, but should be considered malicious afterwards. For example, built-in-tests are allowed during maintenance and service, but should not be allowed during normal driving. These example contextual whitelists for processes can help the controller 302 avoid malicious use of otherwise authenticated processes that, without context, might go undetected.

The controller 302 may only implement portions of the security features provided through the process whitelist 318 based on the mode of operation for the controller 302, as indicated by mode of operation rules 320. The rules 320 indicate which portions of the process whitelist 318 are activated during the mode of operation for the controller 302. For example, during normal modes of operation the controller 302 may only use the process signatures from the whitelist 318 verify that processes being executed by the CPU 312 are authentic and permitted. However, during safe mode (which may be activated in response to a threat being blocked by the controller 302 or by other connected controllers), the controller 302 may additionally use the context-based security features of the whitelist 318. Other configurations and uses of the rules 320 are also possible.

The process whitelist 318 can include, for example, whitelist elements with at least these fields:
 1. Name
 2. Type {Binary file/Binary library/Script file/Configuration file/Hardware resource}
 3. Digital Signature
 4. Context {Initiation state/Shutdown state/Operational state/In motion state/Context1/ . . . /Context N/All}

Additionally, context-based whitelist checks can be performed with increased granularity on the controller 302 to ensure that authorized processes operate within their approved bounds. For example, granular context-based whitelisting can include checks being added for the following operations by the controller 302:
 1. File Open operations: during any load of Configuration and Script files. Digital signature and context can be verified by the controller 302.
 2. Load Library Qperarions: during any load of Binary libraries. Digital signature and context can be verified by the controller 302.
 3. OS resource operations: during any interaction with hardware devices or network ports. Digital signature and context can be verified by the controller 302.

FIG. 4 depicts is an example process whitelist 400. The example whitelist 400 includes a number of fields for each process, such as a unique identifier 402 (e.g., system-level process identifier), a process name 404 (e.g., name of the executable file), a file type 406 (e.g., binary, script, executable library), a digital signature 408 (e.g., SHA256 signature, checksums, cyclic redundancy check (CRC) signature), and permitted context 410 (e.g., initiation state, shutdown state, operational state, in motion state, specific context N, all). The whitelist 400 can be maintained, for example, on the controller 202 using one or more security features, such as being stored as read only with root level permissions and/or being encrypted on the controller 202. Example entries 412*a-n* in the whitelist 400 are also depicted.

Example pseudocode for implementing context-based whitelists (e.g., on the controller 202) using modes of operation is as follows:

```
<Process_Execution_Commands>(..., <process>, ..., <binary_code>, ...)
{
   if (<current_mode> <matches> <safe_mode>)
   {
      if (<current_vehicle_context> <doesn't match> <process context from whitelist>)
      {
         <return_value> <error_out_of_context>,
      }
      <signature> = <local calculation of digital signature>
      if(<signature> <doesn't match> <process signature from whitelist>)
      {
         <return_value> <error_malicious>;
      }
      // continue with normal execution
   }
   ...
}
```

FIGS. 5A-C depict example alert information that can be generated and transmitted. For example, alert information can be generated by a reporting agent, such as the reporting agent 234, and transmitted to a backend server system, such as the management computer system 122 and/or the management computer system 164. As another example, alert information can be generated by the reporting agent 234 of the controller 202, and transmitted to one or more other controllers 264a-n over the CAN Bus 262. FIG. 5A depicts an example alert 500 for blocked malware attempts. FIG. 5B depicts an example alert 540 for blocked network packets. FIG. 5C depicts an example log entry 570.

Referring to FIG. 5A, the blocked malware alert 500 can include a variety of information, such as a controller identifier 502 that can uniquely identify the controller blocking the malware, a timestamp 504 at which the malware attempt was blocked on the controller, malware information 506 that can identify information about the malware attack (e.g., trace information), controller state information 512 that can identify a current state for the controller (e.g., resource usage information, network connections), and controller context information 514 that can identify a broader context within which the controller currently exists (e.g., vehicle location, vehicle operational state). Additional information can also be included in the alert 500. Alternatively, the alert 500 can include only portions or sub-combinations of this example information.

Referring to FIG. 5B, the blocked network packet alert 540 can include a variety of information, such as a controller identifier 542 that can uniquely identify the controller blocking the network packet, a timestamp 544 at which the network packet was blocked on the controller, network packet information 546 that can identify information about the network packet transmission that was attempted (e.g., trace information), controller state information 552 that can identify a current state for the controller (e.g., resource usage information, network connections), and controller context information 554 that can identify a broader context within which the controller currently exists (e.g., vehicle location, vehicle operational state). Additional information can also be included in the alert 540. Alternatively, the alert 540 can include only portions or sub-combinations of this example information.

Referring to FIG. 5C, the operation log 570 can include a variety of information, such as a controller identifier 572 that can uniquely identify the controller blocking the network packet, a timestamp 574 at which the operation that is the subject of the log was performed, operation information 576 that can identify information about the operation that was performed (e.g., trace information), controller state information 578 that can identify a current state for the controller (e.g., resource usage information, network connections), and controller context information 580 that can identify a broader context within which the controller currently exists (e.g., vehicle location, vehicle operational state). Additional information can also be included in the log 570. Alternatively, the log 570 can include only portions or sub-combinations of this example information.

FIG. 6 is a flowchart of an example technique 600 for implementing a context-based whitelist on a controller using modes of operation. The technique 600 can be performed by any of a variety of appropriate controllers, such as the controller 114, the ECUs 156a-n, the controller 202, the controllers 264a-n, and/or other controllers. Normal operation occurs (602), then the controller enters safe mode (604). For example, the controller 264a may detect an attack attempt based on the malware 212, and may enter safe mode in response to the detected attack attempt. In another example, the controller 264a can be notified by another controller that the other controller has blocked a malware attempt, which can cause the controller 264a to enter safe mode. The controller receives a current context (612), a process execution command (614), and a whitelist entry for the process identified in the command (616), and determines whether the process execution is allowed according to the permitted context for safe mode identified in the whitelist (618). If the context is not included on the whitelisted safe mode contexts for the process, then the process execution is blocked and the malware is reported (620). If the context is included on the whitelisted contexts for safe mode for the process, then the execution of the process can proceed (622). Normal operation of the controller can continue (624).

FIG. 7 is a flowchart of an example technique 700 for implementing a context-based whitelist on a controller using modes of operation. The technique 700 can be performed by any of a variety of appropriate controllers, such as the controller 114, the ECUs 156a-n, the controller 202, the controllers 264a-n, and/or other controllers. A notification of an attack (e.g., an alert) is received from another controller (702), which causes the controller to enter safe mode (704), and to load a whitelist and context information (706) that pertains to safe mode for the controller. A process call is received (712), which causes the controller to obtain a stored whitelist element for the process (714). The controller can determine a signature for the process call (716) can compare the determined signature against the stored signature for the process in the whitelist (718). If the signatures do not match, then an error can be returned (720), and the process can be blocked from being executed and logged (722). If the signatures do match, then the controller can proceed to check the current context of the controller/device before permitting the process to be executed. To do this, the controller can obtain a current context (724) and determine whether the current context is one of the permitted contexts within which the process can be executed during safe mode, as defined by the whitelist element for the process (726). If the context is not one of the whitelisted contexts for the process during safe mode, then an error can be returned (728), and the process can be blocked from being executed and logged (730). If the context is one of the whitelisted contexts for the process during safe mode, then the process call can be transmitted to the processor for execution (732) and information on the process call can be logged, such as context information when the process call was made (734). The controller can continue with safe mode operation (736).

A number of implementations are possible. In one implementation, a method for managing processes in an automotive controller can include receiving a request to run a process execution procedure; based on a current context of at least one automotive system, determining if the process execution procedure is allowable on the automotive controller in the current context in the whitelist; upon a condition in which the process execution procedure is allowable on the automotive controller in the current context in the whitelist, allowing execution of the process execution procedure.

Such an implementation can optionally include one or more of the following features. The receiving, determining and allowing can be executed by the automotive controller. The method can further include executing the process execution procedure by the automotive controller. The automotive controller can be selected from a group including infotainment controller, telematics controller, main computer controller, ABS system controller, navigation system controller, communication system controller, braking system controller, air bag system controller and wheel pressure controller. The process execution procedure can be received in a context of the automotive controller selected from a group consisting of: Initiation state, Shutdown state, Operational state, In motion state.

In another implementation, a method for managing processes in an automotive controller can include receiving a request to load a software library; based on a current context of at least one automotive system, determining if the load a software library is allowable on the automotive controller in the current context in the whitelist; upon a condition in which the load a software library procedure is allowable on the automotive controller in the current context in the whitelist, allowing execution of the load a software library procedure.

Such an implementation can optionally include one or more of the following features. The receiving, determining and allowing can be executed by the automotive controller. The method can further include executing the load a software library procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The load a software library procedure can be received in a context of the automotive controller selected from a group consisting of: Initiation state, Shutdown state, Operational state, In motion state.

In another implementation, a method for managing processes in an automotive controller can include receiving a request to execute a script file; based on a current context of at least one automotive system, determining if the script execution procedure is allowable on the automotive controller in the current context in the whitelist; upon a condition in which the script execution procedure is allowable on the automotive controller in the current context in the whitelist, allowing execution of the script execution procedure.

Such an implementation can optionally include one or more of the following features. The receiving, determining and allowing can be executed by the automotive controller. The method can further include executing the script execution procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The script execution procedure can be received in a context of the automotive controller selected from a group consisting of: Initiation state, Shutdown state, Operational state, In motion state.

In another implementation, a method for managing processes in an automotive controller can include receiving a request to use an operating system resource; based on a current context of at least one automotive system, determining if the use an operating system resource is allowable on the automotive controller in the current context in the whitelist; upon a condition in which the use of an operating system resource procedure is allowable on the automotive controller in the current context in the whitelist, allowing use of the operating system resource procedure.

Such an implementation can optionally include one or more of the following features. The receiving, determining and allowing can be executed by the automotive controller. The method can further include executing the use an operating system resource procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The use of an operating system resource procedure can be received in a context of the automotive controller selected from a group consisting of: Initiation state, Shutdown state, Operational state, In motion state.

In another implementation, an automotive processing system can include a memory unit storing a whitelist; and an automotive controller operable to: receive a request to run a process execution procedure; determine, based on a current context of at least one automotive system, if the process execution procedure is allowable on the automotive controller in the current context in the whitelist; and upon a condition in which the process execution procedure is allowable on the automotive controller in the current context in the whitelist, executing the process execution procedure.

Such an implementation can optionally include one or more of the following features. The receiving, determining and allowing can be executed by the automotive controller. The automotive processing system can further include executing the process execution procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The process execution procedure can be received in a context of the automotive controller selected from a group consisting of: Initiation state, Shutdown state, Operational state, In motion state.

In another implementation, an automotive processing system can include memory unit storing a whitelist; and an automotive controller operable to: receive a request to load a software library; determine, based on a current context of at least one automotive system, if the load a software library procedure is allowable on the automotive controller in the current context in the whitelist; and upon a condition in which the load a software library procedure is allowable on the automotive controller in the current context in the whitelist, executing the load a software library procedure.

Such an implementation can optionally include one or more of the following features. The receiving, determining and allowing can be executed by the automotive controller. The automotive processing system can further include executing the load a software library procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The load a software library procedure can be received in a context of the automotive controller selected from a group consisting of: Initiation state, Shutdown state, Operational state, In motion state.

In another implementation, an automotive processing system can include memory unit storing a whitelist; and an automotive controller operable to: receive a request to execute a script file; determine, based on a current context of at least one automotive system, if the script execution procedure is allowable on the automotive controller in the current context in the whitelist; and upon a condition in which the script execution procedure is allowable on the automotive controller in the current context in the whitelist, executing the script execution procedure.

Such an implementation can optionally include one or more of the following features. The receiving, determining and allowing can be executed by the automotive controller. The automotive processing system can further include executing the script execution procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The script execution procedure can be received in a context of the automotive controller selected from a group consisting of: Initiation state, Shutdown state, Operational state, In motion state.

In another implementation, an automotive processing system can include memory unit storing a whitelist; and an automotive controller operable to: receive a request to use an operating system resource; determine, based on a current context of at least one automotive system, if the use of an operating system resource procedure is allowable on the automotive controller in the current context in the whitelist; and upon a condition in which the use of an operating system resource procedure is allowable on the automotive controller in the current context in the whitelist, allowing use of the operating system resource procedure.

Such an implementation can optionally include one or more of the following features. The receiving, determining and allowing can be executed by the automotive controller. The automotive processing system can further include executing the use an operating system resource procedure by the automotive controller. The automotive controller can be selected from a group consisting of: infotainment controller, telematics controller, main computer controller, ABS system controller, navigation system controller, communication system controller, braking system controller, air bag system controller and wheel pressure controller. The use of an operating system resource procedure can be received in a context of the automotive controller selected from a group consisting of: Initiation state, Shutdown state, Operational state, In motion state.

FIG. 8 is a block diagram of example computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 800 is further intended to represent any other typically non-mobile devices, such as televisions or other electronic devices with one or more processers embedded therein or attached thereto. Computing device 850 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 800 includes a processor 802, memory 804, a storage device 806, a high-speed controller 808 connecting to memory 804 and high-speed expansion ports 810, and a low-speed controller 812 connecting to low-speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed controller 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low-speed controller 812 manages lower bandwidth-intensive operations. Such allocation of duties is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed bus 814. The low-speed bus 814 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as computing device 850. Each of such devices may contain one or more of computing devices 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The computing device 850 may also be provided with a storage device, such as a micro-drive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the computing device 850, such as control of user interfaces, applications run by computing device 850, and wireless communication by computing device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of computing device 850 with other devices. External interface 862 may provide, for example, for wired communication (e.g., via a docking procedure) or for wireless communication (e.g., via Bluetooth® or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to computing device 850 through expansion interface 872, which may include, for example, a subscriber identification module (SIM) card interface. Such expansion memory 874 may provide extra storage space for computing device 850, or may also store applications or other information for computing device 850. Specifically, expansion memory 874 may include instructions to carry out or supplement the processes described above, and may include secure information also. Thus, for example, expansion memory 874 may be provide as a security module for computing device 850, and may be programmed with instructions that permit secure use of computing device 850. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Computing device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 868 (e.g., a radio-frequency transceiver). In addition, short-range communication may occur, such as using a Bluetooth®, WiFi, or other such transceiver (not shown). In addition, GPS receiver module 870 may provide additional wireless data to computing device 850, which may be used as appropriate by applications running on computing device 850.

Computing device 850 may also communicate audibly using audio codec 860, which may receive spoken information from a user and convert it to usable digital information. Audio codec 860 may likewise generate audible sound for a user, such as through a speaker, e.g., in a handset of computing device 850. Such sound may include sound from voice telephone calls, may include recorded sound (e.g., voice messages, music files, etc.) and may also include sound generated by applications operating on computing device 850.

The computing device 850 may be implemented in a number of different forms, as shown in the figure. For example, it may be implemented as a cellular telephone 880. It may also be implemented as part of a smartphone 882, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for data communication for the operation of an automobile, the system comprising:
   the automobile, the automobile comprising:
      a first electronic control unit (ECU) being directly accessible to external networks that are outside of the automobile;
      a second ECU that is not directly accessible to the external networks that are outside of the automobile;
      a control area network (CAN) bus that communicably couples the first ECU and the second ECU such that the first ECU and the second ECU can pass data communications within the automobile;
   wherein the first ECU that is directly accessible to the external networks that are outside of the automobile is configured to:
      operate either in a normal mode or in a first safe-mode, wherein:
         the normal mode and first safe-mode are defined in a security policy for the first ECU, and
         the first safe-mode restricts the actions of the first ECU more than the normal mode based on predefined permitted contexts, wherein at least one of the predefined permitted contexts defines whether software changes to the first ECU are permitted;
      while operating in the normal mode, detect an attempted attack on the automobile;
      responsive to detecting the attempted attack on the automobile, determine that the detected attempted attack is indicative of attempted malicious execution by malware;
      responsive to determining that the detected attempted attack is indicative of attempted malicious execution by malware, change modes from the normal mode to the first safe-mode;
      responsive to determining that the detected attempted attack is indicative of attempted malicious execution by malware, transmit over the CAN bus a safe-mode alert;
   wherein the second ECU that is not directly accessible to the external networks that are outside of the automobile is configured to:
      operate in either the normal mode or a second safe-mode, wherein:
         the normal mode and second safe-mode are defined in a security policy for the second ECU, and
         the second safe-mode restricts the actions of the second ECU more than the normal mode, and
         the second safe-mode comprises different security policies than the first safe-mode;
      while operating in the normal mode, receive the safe-mode alert from the first ECU over the CAN bus; and
      responsive to receiving the safe-mode alert, change modes from the normal mode to the second safe-mode.

2. The system of claim 1, wherein the system further comprises a plurality of other ECUs; and wherein each of the other ECUs receives, while operating in the normal mode, the safe-mode alert.

3. The system of claim 2, wherein each of the other ECUs is configured to, responsive to receiving the safe-mode alert, change modes from the normal mode.

4. The system of claim 3, wherein at least one of the other ECUs is configured to change modes to either of the first safe-mode and the second safe-mode.

5. The system of claim 1, wherein the first safe-mode comprises preventing external network communications while in the first safe-mode.

6. The system of claim 2, wherein the second safe-mode comprises restricting execution to a whitelist of permitted processes.

7. The system of claim 1, wherein the first ECU is further configured to:
   while in the first safe-mode:
      determine a current context of the first ECU that described a state of operation of the first ECU;
      compare the current context to each of a plurality of permitted contexts of the first ECU, each of the plurality of permitted contexts of the first ECU describing a potential state of operation of the first ECU in which the first ECU should be permitted to perform a given action;

perform or deny a proposed given action depending on a match or lack of match between the current context and the plurality of permitted contexts.

8. The system of claim 7, wherein the first ECU is further configured to:

while in the normal mode, perform a given action without consideration of a comparison between the current context and the plurality of permitted contexts.

9. The system of claim 7, wherein the first ECU is further configured to:

while in the first safe-mode:
restrict the current context of the first ECU to only one of a plurality of predefined permitted contexts.

10. The system of claim 9, wherein restricting the current context of the first ECU to only one of a plurality of predefined permitted contexts comprises restricting the automobile from autonomous navigation, wherein autonomous navigation is permitted when the first ECU is in the normal mode.

11. The system of claim 9, wherein restricting the current context of the first ECU to only one of a plurality of predefined permitted contexts comprises restricting the first ECU from performing a software update, wherein software updates are permitted when the first ECU is in the normal mode.

12. The system of claim 1, wherein:
the automobile further comprises a third ECU;
the CAN bus further communicably couples the third ECU to the first ECU and to the second ECU such that the third ECU can pass data communications within the automobile; and
wherein the third ECU does not include functionality to operate in a safe-mode.

13. The system of claim 1, wherein changing modes from the normal mode to the first safe-mode comprises transmitting over the CAN bus the safe-mode alert.

14. The system of claim 1, wherein:
the malware comprises computer-readable instructions that, if executed by the first ECU would cause the first ECU to transmit a copy of the malware to the second ECU across the CAN bus; and
changing modes by the first ECU prevents transmission of the copy of the malware by the first ECU to the second ECU.

15. The system of claim 1, wherein the first ECU is further configured to:
in the normal mode, permit communications between the first ECU and external destinations outside of the automobile across the external networks; and
in the first safe-mode, prevent communications between the first ECU and the external destinations outside of the automobile across the external networks.

16. A system for data communication for the operation of an automobile, the system comprising:
a first electronic control unit (ECU) configured to be placed within an automobile, the first ECU being directly accessible to external networks that are outside of the automobile;
a second ECU that is not directly accessible to the external networks that are outside of the automobile;
wherein the first ECU and the second ECU are configured to connect to a control area network (CAN) bus that communicably couples the first ECU and the second ECU such that the first ECU and the second ECU can pass data communications within the automobile;

wherein the first ECU that is directly accessible to the external networks that are outside of the automobile is configured to:
operate either in a normal mode or in a first safe-mode, wherein:
the normal mode and first safe-mode are defined in a security policy for the first ECU, and
the first safe-mode restricts the actions of the first ECU more than the normal mode based on predefined permitted contexts, wherein at least one of the predefined permitted contexts defines whether software changes to the first ECU are permitted;
while operating in the normal mode, detect an attempted attack on the automobile;
responsive to detecting the attempted attack on the automobile, determine that the detected attempted attack is indicative of attempted malicious execution by malware;
responsive to determining that the detected attempted attack is indicative of attempted malicious execution by malware, change modes from the normal mode to the first safe-mode;
responsive to determining that the detected attempted attack is indicative of attempted malicious execution by malware, transmit over the CAN bus a safe-mode alert;
wherein the second ECU is configured to:
operate in either the normal mode or a second safe-mode, wherein:
the normal mode and second safe-mode are defined in a security policy for the second ECU, and
the second safe-mode restricts the actions of the second ECU more than the normal mode, and
the second safe-mode comprises different security policies than the first safe-mode;
while operating in the normal mode, receive the safe-mode alert from the first ECU over the CAN bus; and
responsive to receiving the safe-mode alert, change modes from the normal mode to the second safe-mode.

17. The system of claim 16, wherein the system further comprises a plurality of other ECUs; and wherein each of the other ECUs receives, while operating in the normal mode, the safe-mode alert.

18. The system of claim 17, wherein each of the other ECUs is configured to, responsive to receiving the safe-mode alert, change modes from the normal mode; and wherein at least one of the other ECUs is configured to change modes to either of the first safe-mode and the second safe-mode.

19. A method for data communication for the operation of an automobile, the system comprising:
detecting, by a first electronic control unit (ECU) an attempted attack on an automobile while operating in a normal mode, wherein:
the first ECU is configured to operate either in the normal mode or in a first safe-mode, wherein:
the normal mode and first safe-mode are defined in a security policy for the first ECU, and
the first safe-mode restricts the actions of the first ECU more than the normal mode based on predefined permitted contexts, wherein at least one of the predefined permitted contexts defines whether software changes to the first ECU are permitted;

the first ECU is in the automobile and the first ECU is directly accessible to external networks that are outside of the automobile;

a second ECU is in the automobile and the second ECU is not directly accessible to the external networks that are outside of the automobile;

a control area network (CAN) bus communicably couples the first ECU and the second ECU such that the first ECU and the second ECU can pass data communications within the automobile;

responsive to detecting the attempted attack on the automobile, determining, by the first ECU, that the detected attempted attack is indicative of attempted malicious execution by malware;

responsive to determining that the detected attempted attack is indicative of attempted malicious execution by malware, changing modes, by the first ECU, from the normal mode to the first safe-mode;

responsive to determining that the detected attempted attack is indicative of attempted malicious execution by malware, transmit, by the first ECU over the CAN bus a safe-mode alert; and while operating in the save mode, receiving, by the second ECU, the safe-mode alert from the first ECU over the CAN bus, wherein the second ECU is configured to operate in either the normal mode or a second safe-mode, wherein:

the normal mode and second safe-mode are defined in a security policy for the second ECU, and the second safe-mode restricts the actions of the second ECU more than the normal mode, and the second safe-mode comprises different security policies than the first safe-mode.

* * * * *